(12) United States Patent
Thetford

(10) Patent No.: US 7,767,750 B2
(45) Date of Patent: Aug. 3, 2010

(54) COMPOSITIONS

(75) Inventor: Dean Thetford, Greater Manchester (GB)

(73) Assignee: The Lubrizol Corporation, Wickcliffe, OH (US)

( * ) Notice: Subject to any disclaimer, the term of this patent is extended or adjusted under 35 U.S.C. 154(b) by 862 days.

(21) Appl. No.: 10/564,803

(22) PCT Filed: Jul. 14, 2004

(86) PCT No.: PCT/US2004/022763

§ 371 (c)(1),
(2), (4) Date: Nov. 29, 2006

(87) PCT Pub. No.: WO2005/010109

PCT Pub. Date: Feb. 3, 2005

(65) Prior Publication Data

US 2008/0125540 A1     May 29, 2008

(30) Foreign Application Priority Data

Jul. 18, 2003 (GB) ................... 0316857.2
Nov. 1, 2003 (GB) ................... 0325537.9

(51) Int. Cl.
| | |
|---|---|
| C08G 69/40 | (2006.01) |
| C08G 69/02 | (2006.01) |
| C08G 73/04 | (2006.01) |
| C08K 5/16 | (2006.01) |
| C08K 5/09 | (2006.01) |
| C08L 77/06 | (2006.01) |
| B01F 17/16 | (2006.01) |

(52) U.S. Cl. .................. 524/538; 524/210; 524/217; 524/539; 524/606; 524/608; 524/612; 516/203; 525/540

(58) Field of Classification Search .............. 524/607, 524/608, 210, 217, 538, 539, 606, 612; 516/203; 525/540
See application file for complete search history.

(56) References Cited

U.S. PATENT DOCUMENTS

| 4,401,581 | A | * | 8/1983 | Burrows et al. | ............. 508/238 |
| 4,645,611 | A | | 2/1987 | Campbell et al. | |
| 4,689,051 | A | * | 8/1987 | Sung | ............................ 44/407 |
| 4,747,971 | A | * | 5/1988 | Erdman | ..................... 508/228 |
| 6,197,877 | B1 | | 3/2001 | Thetford et al. | |
| 6,423,785 | B1 | * | 7/2002 | Esselborn et al. | ........ 525/327.6 |
| 6,440,207 | B1 | * | 8/2002 | Schulz | ...................... 106/412 |
| 2002/0169251 | A1 | * | 11/2002 | He | .............................. 524/599 |
| 2005/0120911 | A1 | * | 6/2005 | Huber et al. | ............. 106/31.49 |

FOREIGN PATENT DOCUMENTS

| EP | 0 722 994 A1 | 7/1996 |
| EP | 0 905 207 A2 | 3/1999 |

* cited by examiner

*Primary Examiner*—Mark Eashoo
*Assistant Examiner*—Michael Pepitone
(74) *Attorney, Agent, or Firm*—Samuel B. Laferty

(57) ABSTRACT

The present invention provides a composition containing a particulate solid, an organic medium and/or water and a compound of Formula (1) and salts thereof; wherein R is $C_{1-50}$-optionally substituted hydrocarbyl; Y is $C_{2-4}$-alkyleneoxy; T is $C_{2-4}$ alkylene; A is the residue of a dibasic acid or anhydride thereof; Z is the residue of a polyamine and/or polyimine; W is the residue of an oxide, urea or dibasic acid or anhydride thereof; x is from 2 to 60; and v represents the maximum available number of amino and/or imino groups in Z which does not carry the group $RO$—$(Y)_x$-T-NH-A-. The invention further discloses the composition as a dispersant for an organic media.

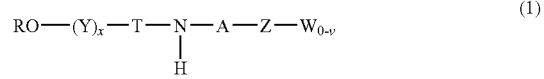

(1)

13 Claims, No Drawings

COMPOSITIONS

This application claims the benefit of priority from PCT WO 2005/010109 (International application PCT/US2004/022763) and its priority documents GB0316857.2 filed on Jul. 18, 2003 and GB 0325537.9 filed on Nov. 1, 2003.

FIELD OF INVENTION

The present invention relates to compositions comprising a particulate solid, an organic medium and a dispersant and to their use in inks, millbases, plastics and paints. Some of the dispersants are new.

BACKGROUND OF THE INVENTION

Many formulations such as inks, paints, mill-bases and plastics materials require effective dispersants for uniformly distributing a particulate solid in an organic medium. The organic medium may vary from a polar to non-polar organic medium. Consequently, dispersants are sought which can disperse a particulate solid in both a polar and a non-polar organic medium.

U.S. Pat. No. 4,865,621 discloses motor fuel compositions comprising the reaction product of a dibasic acid anhydride, a polyoxyalkylene monoamine and a hydrocarbyl polyamine having a number average molecular weight of up to 1343.

SUMMARY OF THE INVENTION

It has been found that certain dispersants show excellent ability to disperse a particulate solid in a range of organic media, particularly polar organic media and including water. Thus according to the present invention there is provided a composition comprising a particulate solid, an organic medium and/or water and a compound of Formula (1) and salts thereof:

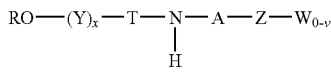

Formula 1 wherein
- R is $C_{1-50}$-optionally substituted hydrocarbyl;
- Y is $C_{2-4}$-alkyleneoxy;
- T is $C_{2-4}$ alkylene;
- A is the residue of a dibasic acid or anhydride thereof;
- Z is the residue of a polyamine and/or polyimine;
- W is the residue of an oxide, urea or dibasic acid or anhydride thereof;
- x is from 2 to 60; and
- v represents the maximum available number of amino and/or imino groups in Z which does not carry the group RO—$(Y)_x$-T-NH-A-.

Since Z is the residue of a polyamine and/or polyimine there is preferably more than 2 groups RO—$(Y)_x$-T-NH-A- attached to Z and these may be the same or different.

In the specific case wherein W is the residue of a dibasic acid there is provided a composition comprising a particulate solid, an organic medium and a compound of formula 1a.

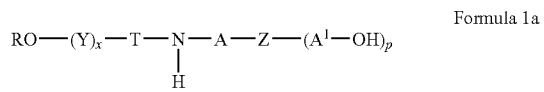

Formula 1a wherein
- R, Y, T, Z and x are as defined hereinbefore;
- A and $A^1$ are, independently, the residue of a dibasic acid which may be the same or different; and
- p is from 0 to 200.

R is preferably aryl, aralkyl, alkaryl, cycloalkyl or alkyl, which may be linear or branched.

When R is aryl it is preferably naphthyl or phenyl.

When R is aralkyl it is preferably 2-phenylethyl or preferably benzyl.

When R is alkaryl it is preferably octyl phenyl or nonyl phenyl.

When R is cycloalkyl it is preferably $C_{3-8}$-cycloalkyl such as cyclopropyl and especially cyclohexyl.

DETAILED DESCRIPTION OF THE INVENTION

The present invention provides a composition as described above.

It is especially preferred that R is optionally branched alkyl and especially $C_{1-36}$ optionally branched alkyl. The group RO— may thus be the residue of an alcohol such as methanol, ethanol, n-propanol, n-butanol, n-hexanol, n-octanol, n-decanol, n-dodecanol, n-tetradecanol, n-hexadecanol, n-octadecanol, isopropanol, isobutanol, tert-butanol, 2-ethylbutanol, 2-ethylhexanol, 3-heptanol, 3,5,5-trimethylhexanol, 3,7-dimethyloctanol and the so-called Guerbet alcohols such as those which are commercially available under the trade name Isofol (ex Condea GmbH) including mixtures thereof. Specific examples of Guerbet alcohols are Isofol 12, 14T, 16, 18T, 18E, 20, 24, 28, 32, 32T and 36.

It is especially preferred that R is $C_{1-6}$-alkyl and especially $C_{1-4}$-alkyl such as methyl.

When R is substituted hydrocarbyl, the substituent may be $C_{1-10}$-alkoxy, carbonyl, sulphonyl, carbamoyl, sulphamoyl, halogen, nitrile, ureido, urethane or ester (i.e. —COO— or —OCO—). However, it is much preferred that R is unsubstituted.

The chain represented by $(Y)_x$ may contain only one type of $C_{2-4}$-alkyleneoxy repeat unit or it may contain two or more different $C_{2-4}$-alkyleneoxy repeat units. When the chain represented by $(Y)_x$ contains two or more different $C_{2-4}$-alkyleneoxy repeat units the structure of $(Y)_x$ may be random but is preferably block.

Y is preferably $C_{3-4}$-alkyleneoxy, more preferably —$CH_2CH_2CH_2CH_2O$— or —$CH_2CH(CH_3)CH_2O$— and especially —$CH_2CH(CH_3)O$— or in another embodiment —$CH_2CH_2CH(CH_3)O$— or —$CH_2$—$CH(CH_2$—$CH_3)$—O—.

When Y is $C_{3-4}$-alkyleneoxy the chain represented by $(Y)_x$ may contain up to 95%, more preferably up to 75% and especially up to 50% ethyleneoxy repeat units. Dispersants wherein $(Y)_x$ contains more than 50% and especially more than 75% ethylene oxy repeat units are better suited to aqueous medium, optionally containing polar organic liquids.

When Y is $C_{3-4}$-alkyleneoxy and the chain represented by $(Y)_x$ contains ethyleneoxy (—$CH_2CH_2O$—) the structure of $(Y)_x$ may be random but is preferably block.

A preferred compound of Formula (1) is wherein Y is —CH$_2$CH(CH$_3$)O— and the chain represented by (Y)$_x$ may contain up to 75% ethyleneoxy repeat units.

T is preferably C$_{3-4}$-alkylene and more preferably —CH$_2$CH(CH$_3$)— or in another embodiment —CH$_2$CH$_2$CH$_2$—.

Preferably T is —CH$_2$CH(CH$_3$)— when Y is —CH$_2$CH(CH$_3$)O—.

The group RO—(Y)$_x$-T-NH— is preferably the residue of a polyalkyleneoxide monoalkyl ether monoamine. Compounds of this type are commercially available as the Jeffamine™ M-series of monoamines from Huntsman Corporation. Specific examples of Jeffamine™ amines are M-600 (9,0, 600), M-1000 (3,18,1000), M-2005 (32,2,2000) and M-2070 (10, 31, 2000). The figures in parentheses are approximate repeat units of propylene oxide, ethylene oxide and number-average molecular weight respectively.

When Z is the residue of a polyamine it is preferably polyvinylamine or polyallylamine. Polyallylamine and poly(N-alkyl)allylamines of differing molecular weight are commercially available from Nitto Boseki. Polyvinylamine of differing molecular weight are available from Mitsubishi Kasei.

When Z is the residue of a polyimine it is preferably poly(C$_{2-6}$-alkyleneimine) and especially polyethyleneimine (PEI). The polyimine may be linear or especially branched. Linear polyethyleneimine may be prepared by the hydrolysis of poly(N-acyl) alkyleneimines as described, for example, by Takeo Saegusa et al in *Macromolecules,* 1972, Vol 5, page 4470. Branched polyethyleneimines of differing molecular weight are commercially available from BASF and Nippon Shokubai. Polypropyleneimine dendrimers are commercially available from DSM Fine Chemicals and poly(amidoamine) dendrimers are available as "Starburst" dendrimers from Aldrich Chemical Company.

The number average molecular weight of the polyamine or polyimine is preferably from 500 to 600,000, more preferably from 1,500 to 200,000, even more preferably from 1,500 to 100,000 and especially from 1500 to 50,000. In the case of polyethyleneimine, the number-average molecular weight is preferably not less than 1500, more preferably not less than 3,000 and especially not less than 5,000.

The residue of dibasic acid represented by A and A$^I$ may be derived from any dibasic acid of formula HOOC—B—COOH or anhydride thereof wherein B is a direct bond or a divalent organic moiety containing from 1 to 20 carbon atoms. Preferably if A is derived from an aliphatic dibasic acid or anhydride of the given formula, then B is fully saturated (i.e. it does not include a carbon to carbon double bond). Optionally A$^I$ is derived from an aliphatic dibasic acid or anhydride thereof, then the B used for A$^I$ is fully saturated. B may be aromatic, hetero aromatic, alicyclic or aliphatic which may be optionally substituted. When B is aliphatic containing two or more carbon atoms, it may be linear or branched, saturated (as earlier expressed saturated is preferred, especially for B units going into A) or unsaturated. Preferably B is unsubstituted. It is also preferred that B contains not greater than 12 and especially not greater than 8 carbon atoms. Unsaturated aliphatic B units (such as used to make maleic anhydride) have been associated with highly gelled reaction products under some reaction conditions.

When B is aromatic it is preferably phenylene, when B is alicyclic it is preferably cyclohexylene and when B is aliphatic it is preferably alkylene. Preferred dibasic acids are terephthalic, tetrahydrophthalic, methyl tetrahydrophthalic, hexahydrophthalic, methyl hexahydrophthalic, trimellitic, C$_{1-20}$-alkenyl or alkyl succinic and especially maleic, malonic, succinic and phthalic acids. Preferred anhydrides are glutaric, succinic and phthalic anhydrides.

Mixtures of dibasic acids or anhydrides thereof may be used. Thus A may be the residue of one or more than one different dibasic acid or anhydride. However, it is preferred that A is the residue of a single dibasic acid or anhydride. Similarly, A$^1$ may be the residue of one or more than one different dibasic acid or anhydride. Again, it is preferred that A$^1$ is the residue of a single dibasic acid or anhydride. It is also preferred that both A and A$^1$ are the residue of the same dibasic acid or anhydride. It is much preferred that A and/or A$^1$ is the residue of succinic anhydride.

When W is the residue of an oxide any of the amino or imino groups in Z which do not carry the group RO—(Y)$_x$-T-NH-A- may be converted to a N-oxide by reaction with oxygen (including air) or a peroxide such as hydrogen peroxide or ammonium persulphate.

Similarly when W is the residue of urea the number of free amino and/or imino groups in Z which are reacted with urea may vary over wide limits up to the maximum number of amino or imino groups which do not carry the group RO—(Y)$_x$-T-NH-A-.

In the specific case where W is the residue of a dibasic acid or anhydride it is much preferred that the majority of free amino or imino groups in Z which do not carry the group RO—(Y)$_x$-T-NH-A are reacted with the dibasic acid or anhydride represented by A$^1$.

Thus, when p is other than zero in formula 1a it is preferred that the majority of amine/imine groups in Z which do not carry the group RO—(Y)$_x$-T-NH-A- carry the residue

-A$^I$-OH.

In one preferred embodiment the polyamine or polyimine represented by Z preferably carries 2 or more groups RO—(Y)$_x$-T-NH-A- which may be the same or different. Dispersants of this type may be conveniently represented by Formula (2):

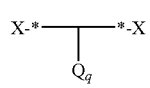

Formula (2)

wherein

X-*-*-X represents the polyamine and/or polyimine;

Q is the chain RO—(Y)$_x$-T-NH-A-; and q is from 2 to 2000.

In a further preferred embodiment the polyamine or polyimine represented by Z preferably carries two or more different polymer chains and is represented by formula 2a.

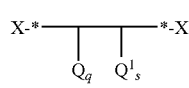

Formula 2a wherein

X-*-*-X and Q are as defined hereinbefore; and

Q$^1$ represents a polyester and/or polyamide chain of formula R$^1$-G-(B)$_s$—;

$R^1$ is hydrogen or $C_{1-50}$-optionally substituted hydrocarbyl;

G is a divalent bond or carbonyl;

B is the residue of one or more amino carboxylic acids, one or more hydroxy carboxyl acids, one or more lactones of hydroxycarboxyl acids, or mixtures thereof;

q and s are positive integers greater than zero; and q+s is from 2 to 2000.

Preferably G is carbonyl and $R^1$-G- is the residue of a $C_{1-50}$-optionally substituted hydrocarbyl carboxylic acid and especially a $C_{1-50}$-optionally substituted aliphatic acid where the aliphatic group may be saturated or unsaturated, linear or branched.

Preferably $R^1$ contains not greater than 36 carbon atoms as disclosed hereinbefore for R.

$R^1$—CO— may also be the residue of a linear or branched, saturated or unsaturated optionally substituted carboxylic acid such as methoxy-acetic acid, propionic acid, butyric acid, hexanoic acid, octanoic acid, lauric acid, dodecanoic acid, stearic acid, 2-ethyl butyric acid, 2-ethyl hexanoic acid, 2-butyl octanoic acid, 2-hexyl decanoic acid, 2-octyl decanoic acid and 2-decyl tetra decanoic acid. Branched alkyl carboxylic acids of this type are also available under the trade name Isocarb (ex Condea GmbH) and specific examples are Isocarb 12, 16, 20, 28, 32, 34T and 36.

When $R^1$ is substituted, the substituent may be one or more ether groups and especially two or more ether groups. Thus, $R^1$—CO— may be the residue of an Akypo carboxylic acid (ex Kao Chem GmbH). Specific examples are Akypo LF1, Akypo LF2, Akypo RLM 25, Akypo RLM 45 CA, Akypo RO 20 VG and Akypo RO 50 VG.

The amino carboxylic acid from which B is obtainable is preferably amino-$C_{2-20}$-alkenylene carboxylic acid and especially amino $C_{1-20}$-alkylene carboxylic acid. Preferably the alk(en)ylene group contains not greater than 12 carbon atoms. Specific examples are 11-amino undecanoic acid and especially 6-amino caproic acid, 4-amino butyric acid, β-alanine and sarcosine.

The hydroxy carboxylic acid from which B is derivable is preferably hydroxy-$C_{2-20}$-alkenylene carboxylic acid and especially hydroxy-$C_{1-20}$ alkylene carboxylic acid. Specific examples of suitable hydroxy carboxylic acids are ricinoleic acid, 12-hydroxystearic acid, 6-hydroxy caproic acid, 5-hydroxy valeric acid, 12-hydroxy dodecanoic acid, 5-hydroxy dodecanoic acid, 5-hydroxy decanoic acid, 4-hydroxy decanoic acid, 10-hydroxy undecanoic acid, lactic acid and glycolic acid.

B is also derivable from a lactone such as β-propiolactone, optionally $C_{1-6}$-alkyl substituted ε-caprolactone and optionally $C_{1-6}$-alkyl substituted δ-valerolactone. Specific examples are ε-caprolactone and the 7-methyl-, 3-methyl-, 5-methyl-, 6-methyl-, 4-methyl-, 5-tetra-butyl-, 4,4,6-trimethyl- and 4,6,6-trimethyl-ε-caprolactone and δ-valerolactone.

The ratio of q to s is preferably from 6:1 to 1:6.

As noted hereinbefore the dispersant may be present in the form of a salt. Where the dispersant contains a carboxylic acid group the salt may be that of an alkali metal such as lithium, potassium or sodium. Alternatively the salt may be formed with ammonia, an amine or quaternary ammonium cation. Examples of amines are methylamine, diethylamine, ethanolamine, diethanolamine, hexylamine, 2-ethylhexylamine and octadecylamine. The quaternary ammonium cation may be a quaternary ammonium cation or a benzalkonium cation. The quaternary ammonium cation preferably contains one or two alkyl groups containing from 6 to 20 carbon atoms. Examples of quaternary ammonium cations are tetraethyl ammonium, N-octadecyl-N,N,N-trimethyl ammonium; N,N-didodecyl-N,N-dimethyl ammonium, N-benzyl-N,N,N-trimethyl ammonium and N-benzyl-N-octadecyl-N,N-dimethyl ammonium cation.

It is much preferred that the dispersant containing a carboxylic acid group is in the form of a free acid.

The dispersant of formula 1 where v is zero may be in the form of a salt of a coloured acid. The coloured acid may be any anionic dyestuff such as sulphonated phthalocyanine, especially a copper or nickel phthalocyanine or a disazo dyestuff containing a sulphonic acid and/or carboxylic acid group.

When v is zero some of the amine/imine groups in Z which do not carry the group RO—$(Y)_x$-T-NH-A- may be quaternised. Preferred quaternisation agents are dimethyl sulphate, benzyl chloride, methyl halides especially chlorine, bromine and iodine, methyl-p-toluene sulphonate and propane sultone.

The compound of Formula (1) may be made by any method known to the art. It is preferably prepared by the reaction of a compound of Formula (3) with a dibasic acid or more preferably anhydride thereof and a polyamine and/or a polyimine and optionally a second dibasic acid or preferably anhydride thereof.

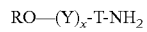    Formula (3)

wherein R, Y, T and x are as described hereinbefore.

Preferably the compound of Formula (3) is reacted with the first dibasic acid or anhydride at a temperature from 40 to 150° C., more preferably from 60 to 100° C. The reaction is preferably performed in an inert atmosphere. The inert atmosphere may be provided by any inert gas of the Periodic Table but is preferably nitrogen.

The reaction with the polyamine and/or polyimine is preferably carried out at a temperature of from 100 to 200° C. Under such conditions the reaction results in a mixture of amide and salt forms rather than the salt form alone.

The reaction involving the optional second dibasic acid or preferably anhydride thereof is preferably carried out using similar conditions to those employed using the first dibasic acid or anhydride thereof.

The reaction involving the first and the second dibasic acid or anhydride thereof may be carried out in the presence of an organic diluent which is inert to the reactants. Similarly, the reaction between the compound of formula 3 and the dibasic acid or anhydride thereof and the polyamine and/or polyimine may also be carried out in the presence of an organic diluent. Preferably, the organic diluent is a solvent for the reactants. The organic diluent may be aromatic or aliphatic including halogenated derivatives. Examples are toluene, chlorobenzene, heptane and petroleum ether distillates. Preferably the reaction is carried out in the absence of an organic diluent.

When W is the residue of an oxide the number of amino and/or imine groups in Z which do not carry the group RO—$(Y)_x$-T-NH-A- may vary over wide limits. Such dispersants are easily prepared by reacting dispersants containing free amino and/or imino groups with an oxidising compound such as oxygen (or air) or a peroxide such as hydrogen peroxide or ammonium persulphate. Similarly, when W is the residue of urea such dispersants may also be readily prepared by reacting any free amino and/or imino groups in Z which do not carry the group RO—$(Y)_x$-T-NH-A- with urea. The reaction is preferably carried out in an inert atmosphere at a temperature between 80 and 140° C.

In the specific case where W is the residue of a dibasic acid or anhydride thereof it is much preferred that the majority of amino and/or imino groups in Z which do not carry the group RO—(Y)$_x$-T-NH-A- are reacted with the dibasic acid or anhydride.

The particulate solid present in the composition may be any inorganic or organic solid material which is substantially insoluble in the organic medium. Preferably the particulate solid is a pigment.

Examples of suitable solids are pigments for solvent inks; pigments, extenders and fillers for paints and plastics materials; disperse dyes; optical brightening agents and textile auxiliaries for solvent dyebaths, inks and other solvent application systems; solids for oil-based and inverse-emulsion drilling muds; dirt and solid particles in dry cleaning fluids; particulate ceramic materials; magnetic materials and magnetic recording media; fibres such as glass, steel, carbon and boron for composite materials, and biocides, agrochemicals and pharmaceuticals which are applied as dispersions in organic media.

A preferred solid is an organic pigment from any of the recognised classes of pigments described, for example, in the Third Edition of the Colour Index (1971) and subsequent revisions of, and supplements thereto, under the chapter headed "Pigments". Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones and carbon blacks.

Preferred inorganic solids include: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt, copper and alloys thereof.

Other useful solid materials include agrochemicals such as the fungicides flutriafen, carbendazim, chlorothalonil and mancozeb.

The organic medium present in the composition of the invention is preferably a plastics material, more preferably an organic liquid. The organic liquid may be a non-polar or more preferably a polar organic liquid. By the term "polar" in relation to the organic liquid it is meant that an organic liquid is capable of forming moderate to strong bonds as described in the article entitled "A Three Dimensional Approach to Solubility" by Crowley et al in Journal of Paint Technology, Vol. 38, 1966, at page 269. Such organic liquids generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran. Especially preferred solvents are alkanols, alkane carboxylic acids and esters of alkane carboxlic acids.

Examples of organic liquids, which can be used as polar organic liquid are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, polyether polyols and multi-media resins such as acrylic and urea/aldehyde.

The organic liquid may be a polyol, that is to say, an organic liquid with two or more hydroxy groups. Preferred polyols include alpha-omega diols, especially alpha-omega diol ethoxylates.

Preferred non-polar organic liquids are compounds containing aliphatic groups, aromatic groups or mixtures thereof.

Preferred non-polar organic liquids are non-halogenated aromatic hydrocarbons (e.g. toluene and xylene), halogenated aromatic hydrocarbons (e.g. chlorobenzene, dichlorobenzene, chlorotoluene), non-halogenated aliphatic hydrocarbons (e.g. linear and branched aliphatic hydrocarbons containing six or more carbon atoms both fully and partially saturated), halogenated aliphatic hydrocarbons (e.g. dichloromethane, carbon tetrachloride, chloroform, trichloroethane) and natural non-polar organics (e.g. vegetable oil, sunflower oil, linseed oil, terpenes and glycerides).

Preferably the organic liquid comprises at least 0.1% by weight, more preferably 1% by weight of a polar organic liquid based on the total organic liquid.

The organic liquid may further comprise water.

When the organic liquid contains water it is preferably not greater than 70%, more preferably not greater than 50%, especially not greater than 40% by weight based on the amount of organic liquid.

The plastics material may be a thermoset resin or a thermoplastic resin. The thermosetting resins useful in this invention include resins which undergo a chemical reaction when heated, catalysed, or subject to UV radiation and become relatively infusible. Typical reactions in thermosetting resins include oxidation or unsaturated double bonds, reactions involving epoxy/amine, epoxy/carbonyl, epoxy/hydroxyl, polyisocyanate/hydroxy, amino resin/hydroxy moieties, free radical reactions or polyacrylate, cationic polymerization or epoxy resins and vinyl ether, condensation or silanol, etc.

Polymers with hydroxy functionality (frequently polyols) are widely used in thermosetting system to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and biphneylmethane diisocyanates.

Particularly preferable thermoplastic resins include polyolefins, polyesters, polyamides, polycarbonates, polyurethanes, polystyrenics, poly(meth)acrylates, celluloses and cellulose derivatives. Said compositions can be prepared in a number of ways but melt mixing and dry solid blending are typical methods.

If desired, the compositions may contain other ingredients, for example resins (where these do not already constitute the organic medium), binders, fluidising agents anti-sedimentation agents, plasticisers, surfactants, anti-foamers, rheology modifiers, levelling agents, gloss modifiers and preservatives.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, preferably contains from 15 to 60% by weight of the solid whereas a composition in which the solid is an inorganic material, such as an inorganic pigment, filler or extender, preferably contains from 40 to 90% by weight of the solid based on the total weight of composition.

The composition may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the composition.

The composition of the present invention is particularly suited to liquid dispersions. For such dispersions a preferred composition comprises:

a) from 0.5 to 30 parts of a particulate solid;
b) from 0.5 to 30 parts of a compound of Formula (1); and
c) from 40 to 99 parts of an organic liquid;

wherein all parts are by weight and the amounts a)+b)+c)= 100.

More preferably component a) comprises from 0.5 to 30 parts of a pigment and such dispersions are useful as liquid inks, paints and mill-bases.

If a composition is required comprising a particulate solid and a dispersant of Formula (1) in dry form, the organic liquid is preferably volatile so that it may be readily removed from the particulate solid by a simple separation means such as evaporation. It is preferred, however, that the composition comprises the organic liquid.

If the dry composition consists essentially of the dispersant of Formula (1) and the particulate solid, it preferably contains at least 0.2%, more preferably at least 0.5% and especially at least 1.0% dispersant of Formula (1) based on weight of the particulate solid. Preferably the dry composition contains not greater than 100%, preferably not greater than 50%, more preferably not greater than 20% and especially not greater than 10% by weight of dispersant of Formula (1) based on the weight of the particulate solid.

As disclosed hereinbefore, the compositions of the invention are particularly suitable for preparing mill-bases wherein the particulate solid is milled in an organic liquid in the presence of a compound for Formula (1) and salts thereof.

Thus, according to a still further aspect of the invention there is provided a mill-base comprising a particulate solid, an organic liquid and a compound of Formula (1) and salts thereof.

Typically, the mill-base contains from 20 to 70% by weight particulate solid based on the total weight of the mill-base. Preferably, the particulate solid is not less than 10 and especially not less than 20% by weight of the mill-base. Such mill-bases may optionally contain a binder added either before or after milling.

The binder is a polymeric material capable of binding the composition on volatilisation of the organic liquid.

Binders are polymeric materials including natural and synthetic materials. Preferred binders include poly(meth)acrylates, polystyrenics, polyesters, polyurethanes, alkyds, polysaccharides such as cellulose, and natural proteins such as casein. Preferably the binder is present in the composition at more than 100% based on the amount of particulate solid, more preferably 200%, especially preferably more than 300% and most preferably more than 400%.

The amount of optional binder in the mill-base can vary over wide limits but is preferably not less than 10%, and especially not less than 20% by weight of the continuous/ liquid phase of the mill-base. Preferably, the amount of binder is not greater than 50% and especially not greater than 40% by weight of the continuous/liquid phase of the mill-base.

The amount of dispersant in the mill-base is dependent on the amount of particulate solid but is preferably from 0.5 to 5% by weight of the mill-base.

Dispersions and mill-bases made from the composition of the invention are particularly suitable for use in coatings and paints, especially high solids paints; inks, especially flexographic, gravure and screen inks; non-aqueous ceramic processes, especially tape-coating, doctor-blade, extrusion and injection moulding type processes; composites, cosmetics, adhesives and plastics materials.

Thus according to a further aspect of the present invention there is provided a paint or ink comprising a particulate solid, an organic liquid, a binder and a compound of Formula (1) and salts thereof.

As noted hereinbefore, many of the dispersants of Formula (1) are novel.

Thus, according to a further aspect of the invention there is provided a compound of Formula (4) and salts thereof.

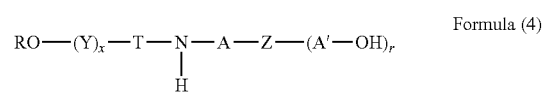

Formula (4)

wherein R, Y, T, A, Z, A$^I$, x, (Y)$_x$ and the salts are as defined hereinbefore and r is from 1 to 200.

A more preferred compound of Formula (4) and salts thereof is provided wherein R, T, A, Z, A$^1$, x, the salts and r are as defined hereinbefore, Y is C$_{3-4}$-alkyleneoxy and the chain represented by (Y)$_x$ may contain up to 75% by number of ethyleneoxy repeat units.

According to a still further aspect of the invention there is provided a compound of Formula (1) and salts thereof wherein Z is a polyamine and/or polyimine having a number average molecular weight of not less than 1500 and where v is zero.

A more preferred compound of Formula (1) and salts thereof is provided wherein Y is C$_{3-4}$-alkyleneoxy, the chain represented by (Y)$_x$ may contain up to 75% by number of ethyleneoxy repeat units and Z is a polyamine and/or polyimine having a number average molecular weight of not less than 1500.

According to a still further aspect of the invention there is provided a compound of formula 1.

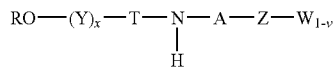

wherein R, Y, T, A, Z, x and v are as defined hereinbefore and W is the residue of an oxide or urea.

The invention is further illustrated by the following examples wherein all references to amounts are in parts by weight unless indicated to the contrary.

EXAMPLES

Example 1

M2005 SA (1:1) PEI (13:1)

Succinic anhydride (2.5 parts, 25 mmols supplied from Aldrich) was added to stirred Jeffamine™ M2005 (50 parts, 25 mmols supplied from Huntsman) under a nitrogen gas atmosphere. The temperature was raised to 80° C. and the mixture stirred continuously for a duration of 8 hrs. Infra red spectroscopy of the mixture showed that some anhydride groups remained. 1.7 parts of Jeffamine™ M2005 was then added to the stirred mixture which was further reacted at 80° C. for 1 hr. Infra red spectroscopy of this mixture showed that all of the anhydride groups had now been successfully reacted. The product was obtained as a pale yellow viscous oil (53.5 g). This is Intermediate 1.

Intermediate 1 (53.5 parts) was stirred with polyethyleneimine SP200 (4.1 g, ex Nippon Shokubia) at 80° C. and heated to a temperature of 120° C. for a duration of 6 hrs under a nitrogen gas atmosphere. After cooling to 25° C. the product was obtained as an amber viscous liquid (55 parts) wherein the weight ratio of the polyether chain to PEI is 13:1. This is Dispersant 1.

Example 2

M2005 SA (1:1) PEI (17:1)

Example 1 was repeated except that the amount of polyethyleneimine was reduced to 3.15 parts. The product was obtained as an amber viscous liquid (55 parts) where the weight ratio of the polyether chain to PEI is 17:1. This is Dispersant 2.

Example 3

M600 SA (1:1) PEI (6:1)

Succinic anhydride (8.34 parts, 83.3 mmols) was added to stirred Jeffamine™ M600 (50 parts, 83.3 mmols supplied from Huntsman) under a nitrogen gas atmosphere. The temperature was raised to 80° C. and the mixture was stirred continuously for a duration of 6 hrs. Infra red spectroscopy of this mixture showed that all of the anhydride groups had been successfully reacted. This is Intermediate 2.

Intermediate 2 (24 parts) was stirred with polyethyleneimine SP200 (4.0 parts) at a temperature of 80° C. under a nitrogen atmosphere. The mixture was heated to 120° C. and stirred for 6 hours still under a nitrogen atmosphere. After cooling to 25° C. the product was obtained as a brown viscous liquid/gum (26 parts) where the weight ratio of polyether chain to PEI is 6:1. This is Dispersant 3.

Example 4

M2005 M600 SA (8.5:3.5:1) PEI (10:1)

Succinic anhydride (2.95 parts, 29.5 mmols) was added to a stirred mixture of Jeffamine™ M600 (10.2 parts, 17 mmols) and Jeffamine™ M2005 (25 parts, 12.5 mmols) under a nitrogen atmosphere. The temperature was raised to 80° C. and the mixture was stirred for a duration of 6 hrs. Infra red spectroscopy showed that all of the anhydride groups had been successfully reacted. After cooling to 25° C. the product was obtained as a yellow viscous liquid. This is Intermediate 3.

Polyethyleneimine SP200 (3.0 parts) was added to Intermediate 3 (30.0 parts) at a temperature of 80° C. The temperature was raised to 120° C. and the mixture was stirred for a duration of 6 hrs under a nitrogen atmosphere. After cooling to 25° C. the product was obtained as an amber viscous liquid (40 parts), wherein the weight ratio of M2005 to M600 to succinic acid is 8.5:3.5:1 and the weight ratio of the polyether chain to PEI is 10:1. This is Dispersant 4.

Example 5

M2005 M600 SA (14.3:1.75:1) PEI (13:1)

Jeffamine M600 (6.13 parts, 10.2 mmols), Jeffamine M2005 (50 parts, 25 mmols) and succinic anhydride (3.5 parts, 35 mmols) were stirred at 80° C. under nitrogen for 6 hours. After cooling to 25° C. the product was obtained as a yellow viscous liquid. This is Intermediate 4.

Polyethyleneimine SP200 (3.0 parts) was added to Intermediate 4 (39 parts) at 80° C. The reactants were stirred under nitrogen at 120° C. for 6 hours. After cooling to 25° C., the product was obtained as an amber viscous liquid (40 parts) wherein the weight ratio of polyether chain to PEI is 13:1. This is Dispersant 5.

Intermediates 5-19

Intermediates 5-15 were prepared using the same method as described in Example 1, except for the differences shown in Table 1.

TABLE 1

Intermediates 5-15

| Inter-mediate | Jeffamine™ Specific Jeffamine™ | Jeffamine™ Amount Used (g) | Anhydride Specific Anhydride | Anhydride Amount Used (g) |
|---|---|---|---|---|
| 5 | M2070 | 200 | Succinic anhydride | 10 |
| 6 | M600 | 200 | Succinic anhydride | 32.5 |
| 7 | M1000 | 400 | Succinic anhydride | 40 |
| 8 | M3003 | 14 | Succinic anhydride | 0.43 |
| 9 | M2005 | 60 | Glutaric anhydride | 3.42 |
| 10 | M2005 | 60 | Diglycolic anhydride | 3.48 |
| 11 | M2070 | 60 | 3,3-tetramethylene-glutaric anhydride | 5 |
| 12 | M2005 | 61.5 | Methylglutaric anhydride | 3.84 |
| 13 | M2005 | 61.5 | Dimethylglutaric anhydride | 4.26 |
| 14 | M2070 | 60 | Succinic anhydride | 6 |
| 15 | M2070 | 200 | Succinic anhydride | 14 |

Intermediate 16 was prepared using the same method as described in Example 1, except 50 g of PAG24A was used instead of Jeffamine™ M2005; and 3 g of succinic anhydride was used. PAG24A is a polyetheramine prepared via cyanoethylation and hydrogenation of polyether from a C12-15 alcohol having an average of 24 repeating units from propylene oxide.

Intermediate 17 was prepared using the same method as described in Example 1, except 60 g of PAG20A was used instead of Jeffamine™ M2005; and 4 g of glutaric anhydride was used instead of succinic anhydride. PAG20A is a polyetheramine prepared via cyanoethylation and hydrogenation of polyether from a C13 alcohol having an average of 20 repeating units from butylene oxide.

Intermediates 18 and 19 are the products of Example 19 in U.S. Pat. No. 6,197,877 and the Polyester of Example 11 of European Patent application 1,224,028 respectively.

Dispersants 6-35

The dispersants 6-35 were prepared using the same method as described in Example 1, except for the differences shown in Table 2.

TABLE 2

Dispersants 6-35

| Dispersant | Intermediate | Specific PEI | Weight Ratio of Intermediate to Polyamine |
|---|---|---|---|
| 6 | 9 | SP 012 | 8:1 |
| 7 | 9 | SP 050 | 12:1 |
| 8 | 10 | SP 018 | 16:1 |
| 9 | 10 | Polymin P | 4:1 |
| 10 | 12 | SP 050 | 12:1 |
| 11 | 13 | SP 200 | 14:1 |
| 12 | 11 | SP 075 | 11:1 |
| 13 | 11 | SP 018 | 18:1 |
| 14 | 11 | SP 200 | 20:1 |
| 15 | 8 | SP 200 | 23:1 |
| 16 | 6 | SP 018 | 7:1 |
| 17 | 16 | SP 200 | 14:1 |
| 18 | 4:1 w:w Intermediates 18:1 | SP 075 | 15:1 |
| 19 | 4:1 w:w Intermediates 19:1 | SP 075 | 9:1 |
| 20 | 17 | SP 075 | 14:1 |
| 21 | 5 | SP 200 | 18:1 |
| 22 | 7 | SP 200 | 9:1 |
| 23 | 5 | SP 200 | 32:1 |
| 24 | 5 | SP 200 | 13:1 |
| 25 | 5 | SP 200 | 17:1 |
| 26 | 18 | SP 200 | 14:1 |
| 27 | 1 | SP 200 | 4:1 |
| 28 | 19 | SP 200 | 13:1 |

Footnote to Table 2:
PEI is polyethyleneimine commercially available from Nippon Shokubai; and Polymin™ P with Mn of 35,000 is commercially available from BASF.

Dispersant 29

Dispersant 1 (59 g) and succinic anhydride (1.86 g) were stirred at 80° C. for 4 hrs under a nitrogen atmosphere. IR of the mixture showed no anhydride present. An amber viscous liquid (58 g) was obtained.

Dispersant 30

Dispersant 7 (20 g) and succinic anhydride (0.73 g) were stirred at 80° C. for 4 hrs under a nitrogen atmosphere. IR of the mixture showed no anhydride present. An amber viscous liquid (19 g) was obtained.

Dispersant 31

Dispersant 8 (20 g) and urea (0.71 g) were stirred at 120° C. for 18 hrs under a nitrogen atmosphere. A brown viscous liquid (18 g) was obtained.

Dispersant 32

Dispersant 12 (16.5 g) and 35% aqueous hydrogen peroxide solution (1.1 g) were stirred at 80° C. for 6 hrs under a nitrogen atmosphere. A pale yellow viscous liquid (58 g) was obtained.

Dispersant 33

Dispersant 18 (20 g) and dimethyl sulphate (0.26 g) were stirred at 90° C. for 4 hrs under a nitrogen atmosphere until all DMS had reacted and could not be detected by bromocresol green indicator. A pale yellow viscous liquid (18 g) was obtained.

Dispersant 34

Dispersant 22 (31 g) and succinic anhydride (1.92 g) were stirred at 80° C. for 4 hrs under a nitrogen atmosphere. IR of the mixture showed no anhydride present. An amber viscous liquid (30 g) was obtained.

Dispersant 35

Dispersant 23 (55 g) and succinic anhydride (1.77 g) were stirred at 80° C. for 4 hrs under a nitrogen atmosphere. IR of the mixture showed no anhydride present. An amber viscous liquid (54 g) was obtained.

Dispersants 36 and 37 were prepared using the same method as described in Example 1, except Intermediate 12 was reacted with a polyallylamine with Mw of 65,000 in weight ratio 10:1 and Intermediate 13 was reacted with a polyallylamine with Mw of 17,000 in weight ratio 5:1 respectively.

Preparation of Mill-Bases

A series of magenta mill-bases were prepared utilising Dispersants 1 to 5. The mill-bases were prepared by dissolving the dispersant (0.40 parts) in the solvent indicated in Table 1. Glass beads (3 mm, 17 parts) and Monolite Rubine 3B (ex Heubach 2.0 parts) were added and the mixture was shaken on a horizontal shaker for 16 hours. The resulting dispersions were then assessed for fluidity using an arbitrary scale of A to E (good to bad). The results are given in Tables 3-4.

TABLE 3

| Dispersant | Toluene | 4:1 MPA:Butanol | 4:1 Butanol:MPA | Ethanol |
|---|---|---|---|---|
| 1 | A/B | A | A | A |
| 2 | B | A/B | A | A |
| 3 | C/D | C | C | C |
| 4 | B | A/B | A/B | A |
| 5 | B | A/B | A/B | A |
| Control | A/B | B/C | D/E | E |

Footnote to Table 3:
The control is poly(ε-caprolactone) end-capped with lauric acid and reacted polyethyleneimine as described in U.S. Pat. No. 4,645,611.
MPA is methoxypropylacetate.

TABLE 4

Mill Grades for Dispersants 6-35

| Dispersant | Milling Grade in 4:1 MPA:Butanol |
|---|---|
| 6 | D |
| 7 | A/B |
| 8 | A/B |
| 9 | A |
| 10 | B |
| 11 | B |
| 12 | A |
| 13 | C |
| 14 | C |
| 15 | A/B |
| 16 | C |
| 17 | B |
| 18 | A |
| 19 | A |
| 20 | B |
| 21 | A |
| 22 | A |
| 23 | A |
| 24 | A |
| 25 | A |
| 26 | A/B |
| 27 | A |
| 28 | B |
| 29 | B |
| 30 | B/C |
| 31 | C |
| 32 | C |
| 33 | B |
| 34 | B |
| 35 | A |
| 36 | A/B |
| 37 | B |
| Control 1 | B/C |
| Control 2 | E |

Tables 3-4 show that dispersants of the present invention give good fluidity with organic media of very different polarities.

Footnote to Table 4: Control 1 is the same control as used in Table 3 and Control 2 is where no dispersing agent has been used in the milling formulation and the weight of dispersant has been replaced by solvent.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements. As used herein, the expression "consisting essentially of" permits the inclusion of substances that do not materially affect the basic and novel characteristics of the composition under consideration.

The invention claimed is:

1. A composition comprising a particulate solid, an organic medium and/or water and
   a compound of formula 1, 2 or 2a including salts thereof

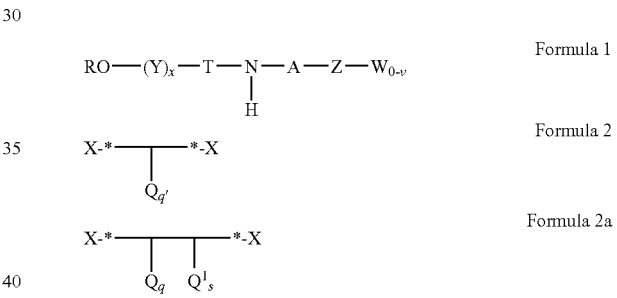

wherein
- X-*-*-X in Formulas 2 and 2a represents the polyamine and/or polyimine (Z);
- Q is the chain RO—$(Y)_x$-T-NH-A-;
- q' in Formula 2 is from 2 to 2000;
- $Q^1$ represents a polyester and/or polyamide chain of formula $R^1$-G-$(B)_s$—;
- $R^1$ is hydrogen or $C_{1-50}$— optionally substituted hydrocarbyl;
- G is a divalent bond or carbonyl;
- B is the residue of one or more amino carboxylic acids and/or one or more hydroxy carboxyl acids or lactones thereof;
- q and s in Formula 2a are positive integers greater than zero; and also in Formula 2a the sum of q+s is from 2 to 2000;
- R is $C_{1-50}$-optionally substituted hydrocarbyl;
- Y is $C_{2-4}$-alkyleneoxy;
- T is $C_{2-4}$-alkylene;
- A is the residue of a dibasic acid or anhydride thereof, wherein A is not the residue of a dibasic acid or anhydride characterized as having an aliphatic carbon to carbon double bond;

Z is the residue of a polyamine and/or polyimine;
W is the residue of an oxide, urea or dibasic acid or anhydride thereof;
x is from 2 to 60;
subscript 0-v is subscript from 0 to v; and
v represents the maximum available number of amino and/or imino groups in Z which does not carry the group RO—$(Y)_x$-T-NH-A-.

2. The composition as claimed in claim 1 comprising a particulate solid, an organic medium and a compound of Formula (1a) and salts thereof:

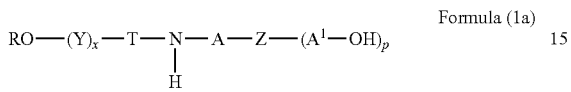

Formula (1a)

wherein:
A and A' are independently, the residue of a dibasic acid which may be the same or different; and
p is from 0 to 200.

3. The composition as claimed claim 1 wherein Y comprises $C_{3-4}$-alkyleneoxy repeat units and the chain represented by $(Y)_x$ may contain up to 75% by number of ethyleneoxy repeat units.

4. The composition as claimed in claim 2 wherein A and A' are residues independently derived from the group consisting of malonic acid, succinic and phthalic acid.

5. The composition as claimed in claim 1 wherein the group represented by Z is polyethyleneimine.

6. The composition as claimed in claim 1 wherein the organic medium is an organic liquid.

7. The composition as claimed in claim 1 wherein the organic medium is a plastics material.

8. The composition as claimed in claim 1 wherein the organic liquid comprises at least 0.1% by weight of a polar organic liquid based on the total organic liquid.

9. The composition as claimed in claim 1 wherein the particulate solid is a pigment.

10. A mill-base comprising a particulate solid, an organic liquid and a compound of Formula (1), 2 or 2a including salts thereof:

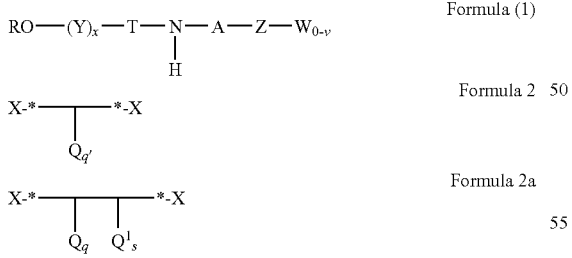

wherein
X-*-*-X in Formulas 2 and 2a represents the polyamine and/or polyimine (Z);
Q is the chain RO—$(Y)_x$-T-NH-A-;
q' in Formula 2 is from 2 to 2000;
$Q^1$ represents a polyester and/or polyamide chain of formula $R^1$-G-$(B)_s$—;
$R^1$ is hydrogen or $C_{1-50}$-optionally substituted hydrocarbyl;
G is a divalent bond or carbonyl;
B is the residue of one or more amino carboxylic acids and/or one or more hydroxy carboxyl acids or lactones thereof;
q and s in Formula 2a are positive integers greater than zero; and also in Formula 2a the sum of q+s is from 2 to 2000;
R is $C_{1-50}$-optionally substituted hydrocarbyl;
Y is $C_{2-4}$-alkyleneoxy;
T is $C_{2-4}$-alkylene;
A is the residue of a dibasic acid or anhydride thereof;
Z is the residue of a polyamine and/or polyimine;
W is the residue of an oxide, urea or dibasic acid or anhydride thereof;
x is from 2 to 60;
subscript 0-v is subscript from 0 to v; and
v represents the maximum available number of amino and/or imino groups in Z which does not carry the group RO—$(Y)_x$-T-NH-A-.

11. A paint or ink comprising a particulate solid, an organic liquid, a binder and a compound of Formula (1), 2, or 2a including salts thereof:

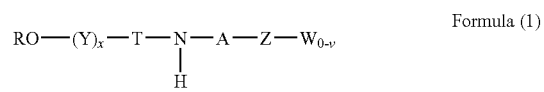

Formula (1)

Formula 2

Formula 2a wherein
X-*-*-X in Formulas 2 and 2a represents the polyamine and/or polyimine (Z);
Q is the chain RO—$(Y)_x$-T-NH-A-;
q' in Formula 2 is from 2 to 2000;
$Q^1$ represents a polyester and/or polyamide chain of formula $R^1$-G-$(B)_s$—;
$R^1$ is hydrogen or $C_{1-50}$-optionally substituted hydrocarbyl;
G is a divalent bond or carbonyl;
B is the residue of one or more amino carboxylic acids and/or one or more hydroxy carboxyl acids or lactones thereof;
q and s in Formula 2a are positive integers greater than zero; and also in Formula 2a the sum of q+s is from 2 to 2000;
R is $C_{1-50}$-optionally substituted hydrocarbyl;
Y is $C_{2-4}$-alkyleneoxy;
T is $C_{2-4}$-alkylene;
A is the residue of a dibasic acid or anhydride thereof;
Z is the residue of a polyamine and/or polyimine;
W is the residue of an oxide, urea or dibasic acid or anhydride thereof;
x is from 2 to 60;
subscript 0-v is subscript from 0 to v; and
v represents the maximum available number of amino and/or imino groups in Z which does not carry the group RO—$(Y)_x$-T-NH-A-.

12. A compound of formula 1b, including salts thereof:

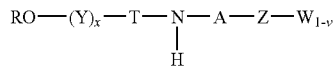

Formula 1b wherein
R is $C_{1-50}$-optionally substituted hydrocarbyl;
Y is $C_{2-4}$-alkyleneoxy;
T is $C_{2-4}$-alkylene;
A is the residue of a dibasic acid or anhydride thereof, wherein A is not the residue of a dibasic acid or anhydride characterized as having an aliphatic carbon to carbon double bond;
Z is the residue of a polyamine and/or polyimine;
W is the residue of an oxide, urea or dibasic acid or anhydride thereof;
x is from 2 to 60;
subscript 1-v is subscript 1 to v; and
v represents the maximum available number of amino and/or imino groups in Z which does not carry the group $RO-(Y)_x$-T-NH-A-.

13. A compound of Formula 1c, 2, or 2a including salts thereof:

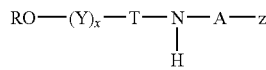

Formula 1c

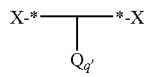

Formula 2

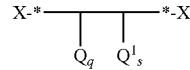

Formula 2a wherein
X-*-*-X in Formulas 2 and 2a represents the polyamine and/or polyimine (Z);
Q is the chain $RO-(Y)_x$-T-NH-A-;
q' in Formula 2 is from 2 to 2000;
$Q^1$ represents a polyester and/or polyamide chain of formula $R^1$-G-$(B)_s$—;
$R^1$ is hydrogen or $C_{1-50}$-optionally substituted hydrocarbyl;
G is a divalent bond or carbonyl;
B is the residue of one or more amino carboxylic acids and/or one or more hydroxy carboxyl acids or lactones thereof;
q and s in Formula 2a are positive integers greater than zero; and also in Formula 2a the sum of q+s is from 2 to 2000;
R is $C_{1-50}$-optionally substituted hydrocarbyl;
Y is $C_{2-4}$-alkyleneoxy;
T is $C_{2-4}$-alkylene;
A is the residue of a dibasic acid or anhydride thereof, wherein A is not the residue of a dibasic acid or anhydride characterized as having an aliphatic carbon to carbon double bond;
Z is the residue of a polyamine and/or polyimine having a number average molecular weight of not less than 1,500; and
x is from 2 to 60.

* * * * *